US012605965B2

(12) United States Patent
Yan et al.

(10) Patent No.: US 12,605,965 B2
(45) Date of Patent: Apr. 21, 2026

(54) CASTER WITH HORIZONTAL BRAKING

(71) Applicant: Benyu Casters & Wheels Co., Ltd, Foshan (CN)

(72) Inventors: Shicong Yan, Foshan (CN); Youwei Liu, Foshan (CN); Wen Chen, Foshan (CN); Chuting Liang, Foshan (CN)

(73) Assignee: Benyu Casters & Wheels Co., Ltd, Foshan (CN)

( * ) Notice: Subject to any disclaimer, the term of this patent is extended or adjusted under 35 U.S.C. 154(b) by 19 days.

(21) Appl. No.: 18/947,453

(22) Filed: Nov. 14, 2024

(65) Prior Publication Data

US 2025/0222719 A1      Jul. 10, 2025

(30) Foreign Application Priority Data

Jan. 10, 2024    (CN) .......................... 202420057014.6

(51) Int. Cl.
B60B 3/00          (2006.01)
B60B 33/00         (2006.01)
(52) U.S. Cl.
CPC ...... B60B 33/0081 (2013.01); B60B 33/0039 (2013.01); B60B 33/0049 (2013.01)
(58) Field of Classification Search
CPC ............ B60B 33/0094; B60B 33/0039; B60B 33/0049; B60B 33/0057; B60B 33/006; B60B 33/0068; B60B 33/0084; B60B 33/0092; B60B 33/025; B60B 33/021; B60B 33/0042; B60B 33/0078; B60B 33/0081; B60B 33/0086; B60B 37/10; B60B 2200/222; B60B 2200/22; B60B 2200/242; B60B 2200/40; B60B 2900/531; B60B 2900/321; B60B 2360/50

See application file for complete search history.

(56) References Cited

U.S. PATENT DOCUMENTS 3,881,216 A * 5/1975 Fontana ................ B60B 33/021
                                              188/31
4,449,268 A * 5/1984 Schnuell ............. B60B 33/0078
                                              16/35 R
(Continued)

FOREIGN PATENT DOCUMENTS

CN        204172967 U   *   2/2015
CN        105216546 A   *   1/2016
(Continued)

*Primary Examiner* — Chuck Y Mah
(74) *Attorney, Agent, or Firm* — Daylight Law, P.C.

(57) ABSTRACT

A caster with horizontal braking includes a connecting base, a wheel rotatably connected to the connecting base, and a brake assembly including a movable plate slidably connected to the connecting base and a rotary plate. The movable plate is provided with a brake pad at an end and a first abutting plate with a limiting portion thereon, and is rotatably connected to the connecting base. A second abutting plate fitted with the first abutting plate is arranged on the rotary plate. When the rotary plate is rotated to cause the second abutting plate to push the first abutting plate to move backward, the brake pad moves backward to abut against the wheel, one end of the second abutting plate is abutted against the limiting portion, the force applied by the wheel to the brake pad opposites the force applied by the second abutting plate to the limiting portion.

10 Claims, 6 Drawing Sheets

(56) References Cited

U.S. PATENT DOCUMENTS

| | | | | | |
|---|---|---|---|---|---|
| 4,706,328 | A | * | 11/1987 | Broeske | B60B 33/021 |
| | | | | | 16/35 R |
| 5,497,856 | A | * | 3/1996 | Block | B60B 33/0081 |
| | | | | | 188/68 |
| 5,675,864 | A | * | 10/1997 | Chou | B60B 33/021 |
| | | | | | 16/35 R |
| 5,829,096 | A | * | 11/1998 | Perry | B60B 33/0081 |
| | | | | | 16/35 R |
| 6,286,184 | B1 | * | 9/2001 | Dean | B60B 33/021 |
| | | | | | 16/35 R |
| 2010/0107360 | A1 | * | 5/2010 | Shih | B60B 1/006 |
| | | | | | 16/21 |

FOREIGN PATENT DOCUMENTS

| | | | | |
|---|---|---|---|---|
| JP | 2003025805 | A | * | 1/2003 |
| JP | 2013010367 | A | * | 1/2013 |
| JP | 2023158845 | A | * | 10/2023 |

* cited by examiner

CASTER WITH HORIZONTAL BRAKING

CROSS-REFERENCE TO RELATED APPLICATION

This application is based on and claims the benefit of priority from Chinese Patent Application No. 2024200570146, filed on 10 Jan. 2024, the entirety of which is incorporated by reference herein for all purposes.

TECHNICAL FIELD

The present disclosure relates to the technical field of casters, and in particular, to a caster with horizontal braking.

BACKGROUND

A caster generally includes a connecting base connected to the bottom of a piece of furniture or an instrument. The caster is generally equipped with a braking structure. When the furniture or instrument is moved to a specified position, the braking structure is applied to lock a wheel of the caster such that the caster cannot continue to roll.

A caster with a braking structure in the existing technology generally adopts a brake pad. The wheel is generally made of rubber. The brake pad is tightly pressed against the wheel to achieve braking through friction between the brake pad and the wheel. However, the friction between the brake pad and the wheel in existing brake mechanisms is insufficient to provide a satisfactory self-locking effect, resulting in unreliable braking.

SUMMARY

The present disclosure aims to solve at least one of the technical problems in the related art to some extent. Therefore, the present disclosure provides a caster with horizontal braking.

An embodiment of the present disclosure provides a caster with horizontal braking, including:

a connecting base;

a wheel, rotatably connected to the connecting base; and a brake assembly, including a movable plate and a rotary plate, where the movable plate is slidably connected to the connecting base to cause the movable plate to move in a front-rear direction, a brake pad is arranged at an end of the movable plate, the brake pad is located on a front side of the wheel, the movable plate is further provided with a first abutting plate, a limiting portion is arranged on the first abutting plate, the rotary plate is rotatably connected to the connecting base, a second abutting plate is arranged on the rotary plate, the first abutting plate is fitted with the second abutting plate, and the rotary plate is rotatable in a first direction or a second direction, where:

when the rotary plate is rotated in the first direction, the second abutting plate pushes the first abutting plate to move backward, the brake pad moves backward to abut against the wheel, and a rear end of the second abutting plate is abutted against the limiting portion; and when the rotary plate is rotated in the second direction, the second abutting plate detaches from the limiting portion, and the wheel pushes the brake pad to move forward away from the wheel.

The caster with horizontal braking according to the embodiment of the present disclosure has at least the following technical effects. When braking is required, the rotary plate is rotated in the first direction, and the second abutting plate pushes the first abutting plate to move backward during rotation, such that the movable plate and the brake pad move backward, and a rear side of the brake pad is abutted against the wheel for braking. In this case, one end of the second abutting plate is abutted against the limiting portion, and the second abutting plate applies a backward force to the limiting portion. Because the wheel is pressed by the brake pad, and the wheel is elastic, the wheel also applies a forward force to the brake pad, such that the movable plate enters a self-locking state. When braking needs to be released, the rotary plate is rotated in the second direction, such that the second abutting plate detaches from the limiting portion, the forward force applied by the wheel to the brake pad pushes the brake pad to move forward away from the wheel, and the first abutting plate is fitted with the second abutting plate again. The caster with horizontal braking has a satisfactory braking effect and can achieve self-locking to improve the reliability of braking.

According to some embodiments of the present disclosure, the connecting base is provided with at least one first elongated through hole extending in the front-rear direction, and the movable plate is provided with at least one insertion strip which is inserted into the at least one first elongated through hole.

According to some embodiments of the present disclosure, the first abutting plate tilts backward from top to bottom, the second abutting plate tilts backward from top to bottom, and a rear side of the second abutting plate is fitted with a front side of the first abutting plate.

According to some embodiments of the present disclosure, the first abutting plate includes a first portion, a second portion, and the limiting portion, and a lower end of the first portion is connected to an upper end of the second portion through the limiting portion.

According to some embodiments of the present disclosure, the first portion tilts backward from top to bottom, the second portion tilts backward from top to bottom, and the limiting portion tilts forward from top to bottom.

According to some embodiments of the present disclosure, an axis of a rotating shaft of the rotary plate and an axis of the wheel lie in the same straight line.

According to some embodiments of the present disclosure, the caster with horizontal braking further includes a first pedal which is fixedly connected to a front end of the rotary plate.

According to some embodiments of the present disclosure, the caster with horizontal braking further includes a second pedal which is fixedly connected to a rear end of the rotary plate.

According to some embodiments of the present disclosure, the at least one first elongated through hole of the connecting base comprises two first elongated through holes, the at least one the insertion strip comprises two insertion strips each provided on a respective one of an upper side and a lower side of the movable plate, and the two insertion strips are respectively inserted into the two first elongated through holes.

According to some embodiments of the present disclosure, the movable plate is provided with a second elongated through hole extending in the front-rear direction, the rotary plate is rotatably connected to the connecting base through a rotating shaft, and the rotating shaft passes through the second elongated through hole.

Additional aspects and advantages of the present disclosure will be partly given in and partly apparent from the description below, or understood through practice of the present disclosure.

BRIEF DESCRIPTION OF DRAWINGS

The above and/or other additional aspects and advantages of the present disclosure will become apparent and comprehensible from the description of embodiments in connection with accompanying drawings, in which.

Figure 1:
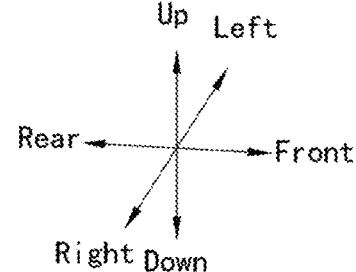
FIG. 1 is a schematic structural view of a caster with horizontal braking according to some embodiments of the present disclosure.
Figure 1:
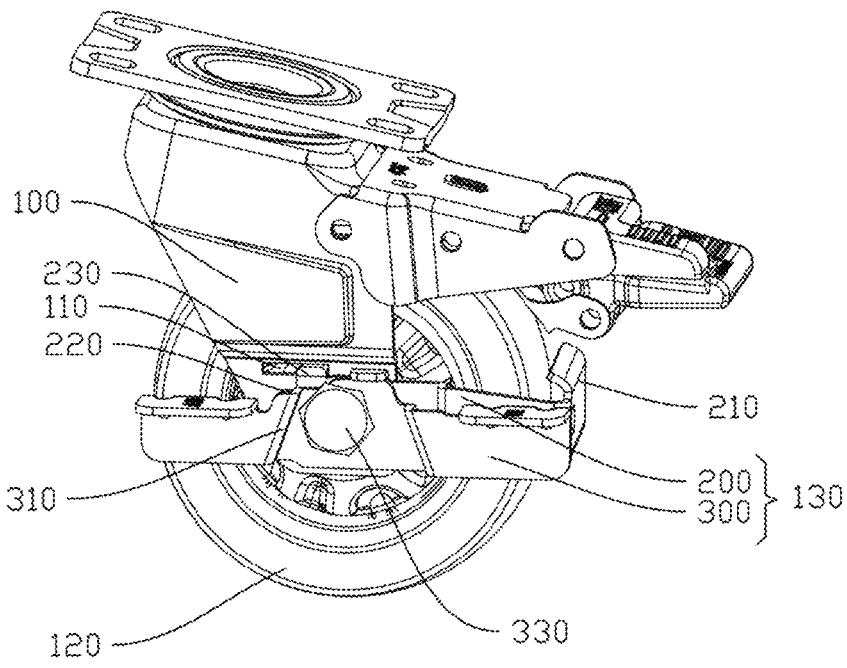

LIST OF REFERENCE NUMERALS connecting base 100, first elongated through hole 110, wheel 120, brake assembly 130;

movable plate 200, brake pad 210, first abutting plate 220, first portion 221, second portion 222, limiting portion 223, insertion strip 230, second elongated through hole 240;

rotary plate 300, second abutting plate 310, first pedal 321, second pedal 322, rotating shaft 330.

DETAILED DESCRIPTION

Embodiments of the present disclosure will be described in detail hereinafter with reference to accompanying drawings in which the same or like reference numerals refer to the same or like elements or elements having the same or like functions throughout. The embodiments described below with reference to the accompanying drawings are exemplary and are intended for illustration only and are not to be construed as limiting the present disclosure.

In the description of the present disclosure, it should be understood that for the description of orientations, the orientation or positional relationships indicated by the terms such as "up", "down", "front", "rear", "left", and "right" are based on orientation or position relationships shown in the accompanying drawings, and are used only for ease and brevity of illustration and description, rather than indicating or implying that the mentioned apparatus or element must have a particular orientation or must be constructed and operated in a particular orientation. Therefore, such terms should not be construed as limiting of the present disclosure. In the description of the present disclosure, the terms such as "first", "second" and the like used herein are merely used for distinguishing technical features, and are not intended to indicate or imply relative importance, or implicitly point out the number of the indicated technical features, or implicitly point out the order of the indicated technical features.

In the description of the present disclosure, unless otherwise explicitly defined, the terms such as "configure", "install/mount" and "connect" should be understood in a broad sense, and those having ordinary skills in the art can reasonably determine the specific meanings of the above terms in the present disclosure based on the specific contents of the technical scheme.

The embodiments of the present disclosure will be further described in detail below with reference to the accompanying drawings.

According to some embodiments of the present disclosure, referring to FIG. 1 to FIG. 4, a caster with horizontal braking includes a connecting base 100, a wheel 120, and a brake assembly 130. The wheel 120 is rotatably connected to the connecting base 100, and an axis of the wheel 120 is in a left-right direction. The brake assembly 130 includes a movable plate 200 and a rotary plate 300. The movable plate 200 is slidably connected to the connecting base 100 to cause the movable plate 200 to reciprocally move in a front-rear direction. A brake pad 210 is arranged at a front end of the movable plate 200. The brake pad 210 is located on a front side of the wheel 120. A first abutting plate 220 is arranged at a rear end of the movable plate 200. A limiting portion 223 is arranged on the first abutting plate 220. The rotary plate 300 is rotatably connected to the connecting base 100. A second abutting plate 310 is arranged on the rotary plate 300. The first abutting plate 220 is fitted with the second abutting plate 310. When the rotary plate 300 is rotated in the first direction, the second abutting plate 310 pushes the first abutting plate 220 to move backward, the brake pad 210 moves backward to abut against the wheel 120, and one end of the second abutting plate 310 is abutted against the limiting portion 223. In this case, a direction of a force applied by the wheel 120 to the brake pad 210 is opposite to a direction of a force applied by the second abutting plate 310 to the limiting portion 223. In other words, the movable plate 200 is subjected to a forward force applied by the wheel 120, and at the same time, is subjected to a backward force applied by the second abutting plate 310. As such, the movable plate 200 is in a self-locking state. When the rotary plate 300 is rotated in the second direction, the second abutting plate 310 detaches from the limiting portion 223, the wheel 120 pushes the brake pad 210 to move forward away from the wheel 120, and the first abutting plate 220 is fitted with the second abutting plate 310. The first direction is a clockwise direction, and the second direction is a counterclockwise direction.

Figure 2:
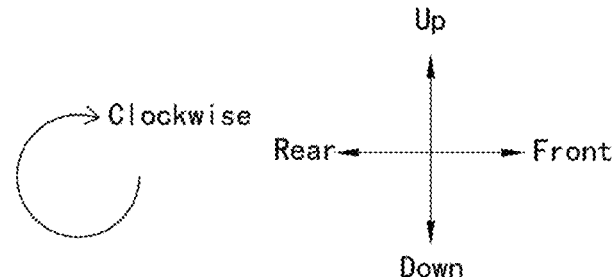
FIG. 2 is a cross-sectional view of a caster with horizontal braking according to some embodiments of the present disclosure.
Figure 2:
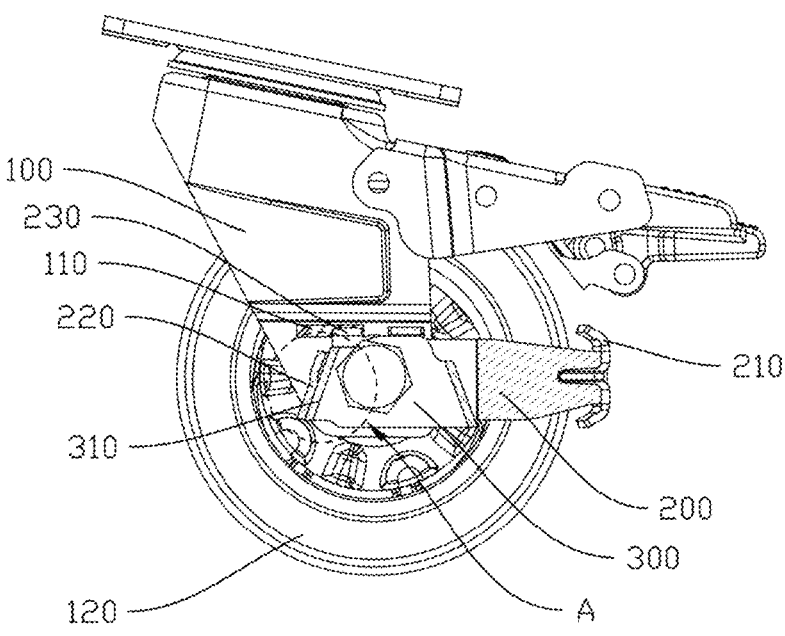
Figure 3:
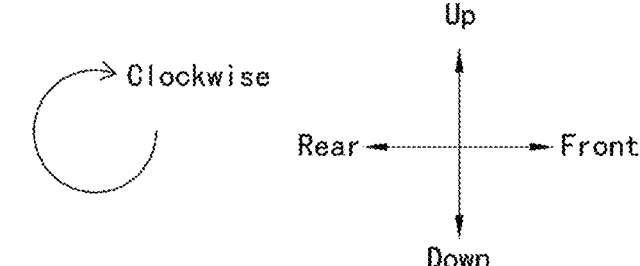
FIG. 3 is a schematic enlarged view of part A in FIG. 2.
Figure 3:
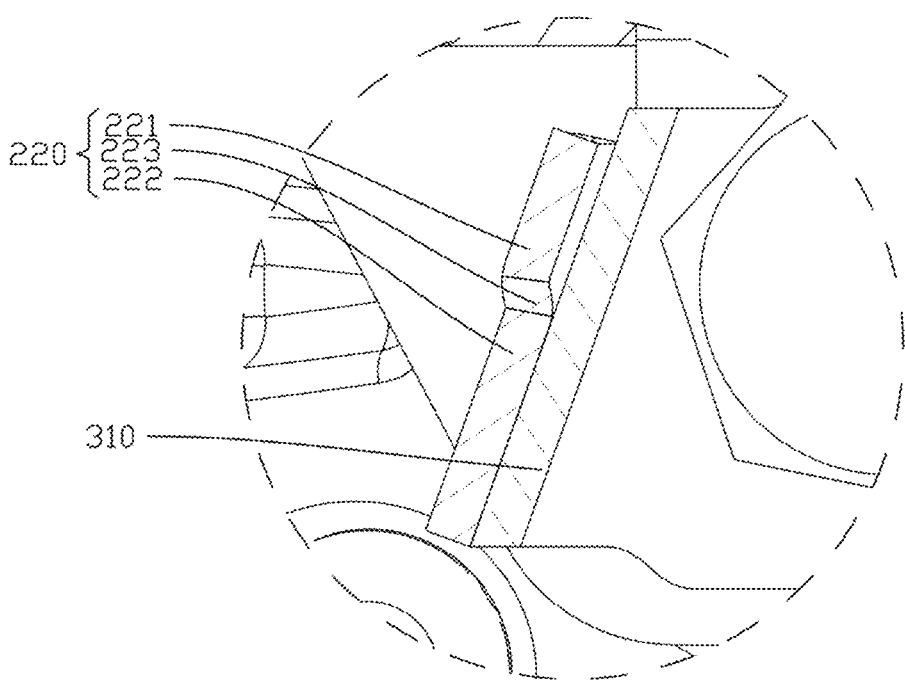
Figure 5:
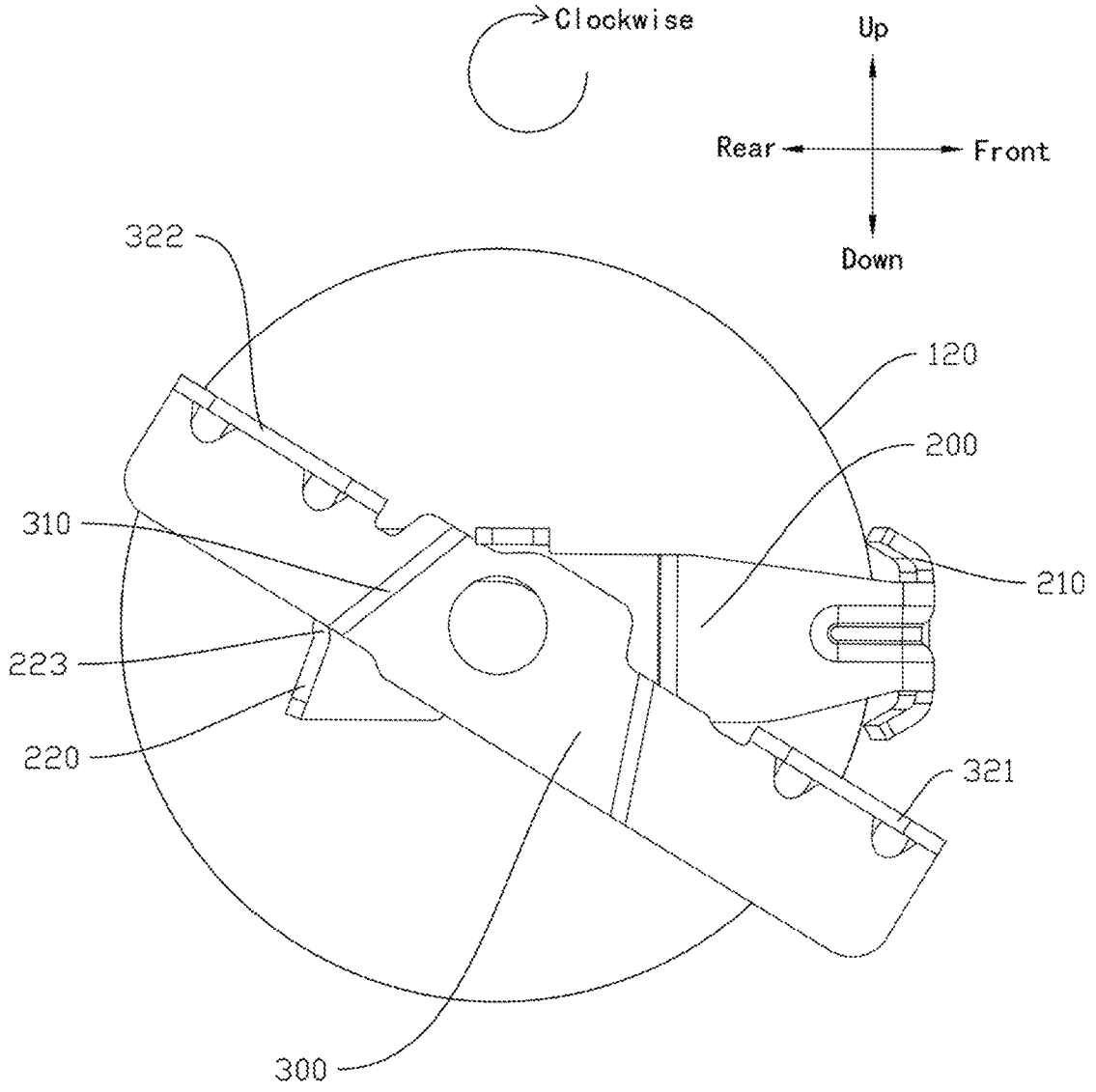
FIG. 5 is a schematic structural view of a caster with horizontal braking in a self-locking state according to some embodiments of the present disclosure.

Referring to FIG. 2, FIG. 3, and FIG. 5, when braking is required, the rotary plate 300 is rotated clockwise, and the second abutting plate 310 pushes the first abutting plate 220 to move backward during rotation, such that the movable plate 200 and the brake pad 210 move backward, and a rear side of the brake pad 210 is abutted against the wheel 120 for braking. In this case, a lower end of the second abutting plate 310 is abutted against the limiting portion 223, and the second abutting plate 310 applies a backward force to the limiting portion 223. Because the wheel 120 is pressed by the brake pad 210, and the wheel 120 is elastic, the wheel 120 also applies a forward force to the brake pad 210. In other words, the movable plate 200 is subjected to a forward force and a backward force at the same time, such that the movable plate 200 enters the self-locking state, i.e., the movable plate 200 rotates from a state shown in FIG. 2 to a state shown in FIG. 5.

Referring to FIG. 2, FIG. 3, and FIG. 5, when braking needs to be released in the state shown in FIG. 5, the rotary plate 300 is rotated counterclockwise, such that the lower end of the second abutting plate 310 detaches from the limiting portion 223, the forward force applied by the wheel 120 to the brake pad 210 pushes the brake pad 210 to move forward away from the wheel 120, and the first abutting plate 220 is fitted with the second abutting plate 310 again.

The caster with horizontal braking of the present disclosure has a satisfactory braking effect and can achieve self-locking to improve the reliability of braking.

Figure 4:
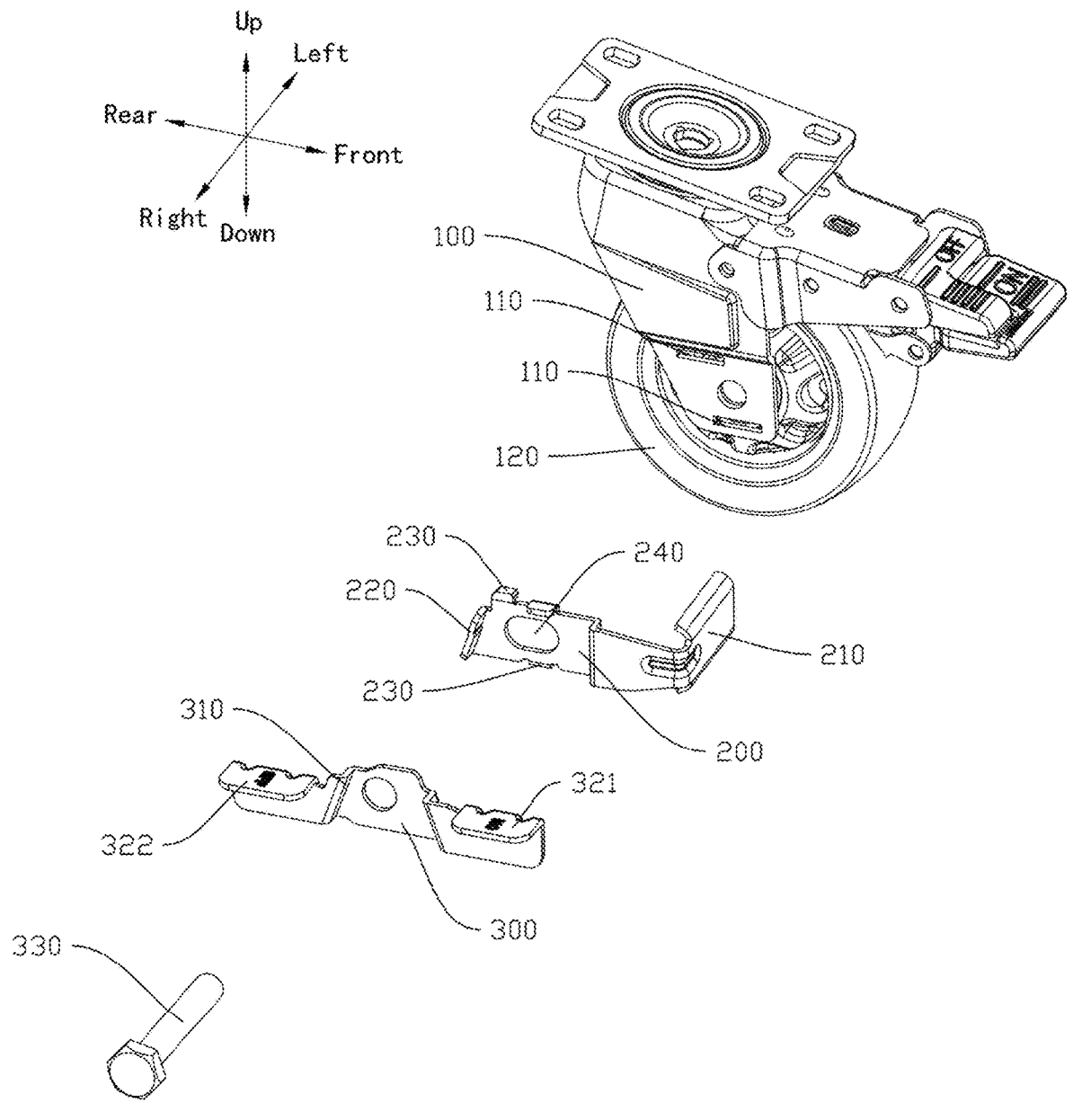
FIG. 4 is an exploded view of a caster with horizontal braking according to some embodiments of the present disclosure.

According to some embodiments of the present disclosure, referring to FIG. 2 and FIG. 4, the connecting base 100 is provided with a first elongated through hole 110 extending in the front-rear direction, and the movable plate 200 is provided with an insertion strip 230 which is inserted into the first elongated through hole 110. The first elongated through hole 110 can guide the insertion strip 230 and the movable plate 200 to move in the front-rear direction.

Preferably, the connecting base 100 is provided with two first elongated through holes 110, the insertion strip 230 is provided on each of an upper side and a lower side of the movable plate 200, and the two insertion strips 230 are respectively inserted into the two first elongated through holes 110. The two insertion strips 230 can improve the stability of the movement of the movable plate 200 in the front-rear direction.

According to some embodiments of the present disclosure, referring to FIG. 3, the first abutting plate 220 tilts backward from top to bottom, the second abutting plate 310 tilts backward from top to bottom, and a rear side of the second abutting plate 310 is fitted with a front side of the first abutting plate 220.

Figure 6:
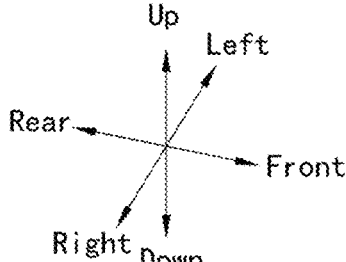
FIG. 6 is a schematic structural view of a movable plate according to some embodiments of the present disclosure.
Figure 6:
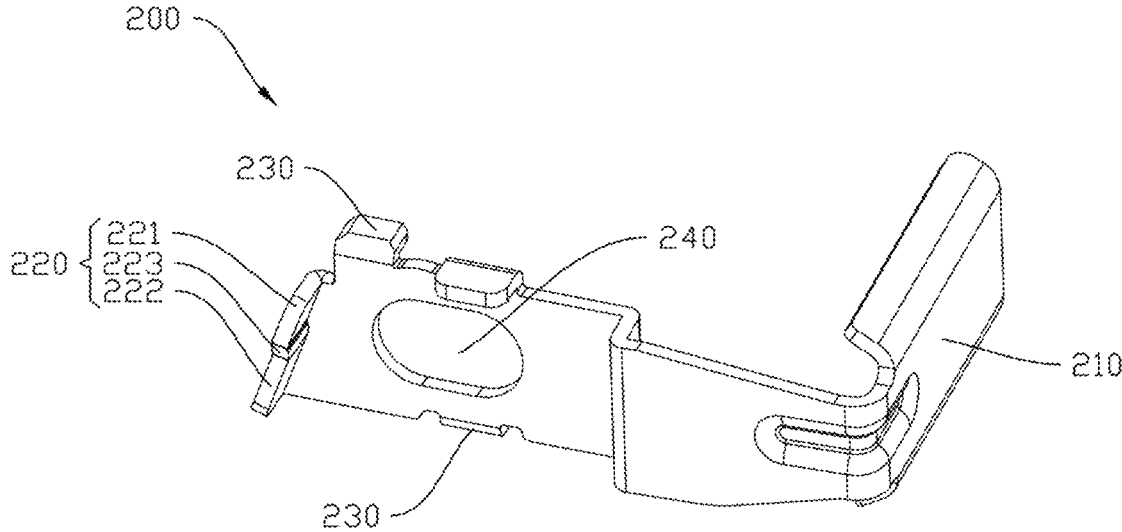

Preferably, referring to FIG. 3, FIG. 5, and FIG. 6, the first abutting plate 220 includes a first portion 221, a second portion 222, and the limiting portion 223, and a lower end of the first portion 221 is connected to an upper end of the second portion 222 through the limiting portion 223. The first portion 221 tilts backward from top to bottom, the second portion 222 tilts backward from top to bottom, and the limiting portion 223 tilts forward from top to bottom.

It may be understood that, referring to FIG. 3, in this case, the caster is in an unlocked state, and a front side of the second portion 222 of the first abutting plate 220 is fitted with the rear side of the second abutting plate 310. Referring to FIG. 5, when the rotary plate 300 is rotated clockwise, the second abutting plate 310 rotates and moves upward while pushing the second portion 222 to move leftward. After the second abutting plate 310 moves upward to a certain position, an upper end of the second abutting plate 310 is abutted against the limiting portion 223. In this case, because the limiting portion 223 tilts forward from top to bottom, the second abutting plate 310 is subjected to a forward force from the limiting portion 223 and the first portion 221, i.e., the second abutting plate 310 applies a backward force to the first abutting plate 220. In this case, the brake pad 210 moves backward to press the wheel 120, and because the wheel 120 is elastic, the wheel 120 applies a forward force to the brake pad 210. Therefore, the rear end of the movable plate 200 is subjected to a backward force, and the front end of the movable plate 200 is subjected to a forward force, such that the movable plate 200 is in the self-locking state. When the braking needs to be released to unlock the movable plate 200, the movable plate 200 is rotated counterclockwise, such that the second abutting plate 310 rotates downward against the resistance of the limiting portion 223 to detach from the limiting portion 223. In this case, the force balance of the movable plate 200 is broken, the brake pad 210 is pushed forward to drive the movable plate 200 to move forward, and the rear side of the second abutting plate 310 is fitted with the second portion 222 of the first abutting plate 220 again.

Preferably, referring to FIG. 1, an axis of a rotating shaft 330 of the rotary plate 300 and an axis of the wheel 120 lie in the same straight line.

According to some embodiments of the present disclosure, referring to FIG. 4 and FIG. 5, the caster with horizontal braking further includes a first pedal 321 and a second pedal 322. A front end of the rotary plate 300 is fixedly connected to the first pedal 321. A rear end of the rotary plate 300 is fixedly connected to the second pedal 322. As such, a user can rotate the rotary plate 300 by stepping on the first pedal 321 or the second pedal 322 to implement a brake or brake release action.

According to some embodiments of the present disclosure, referring to FIG. 4, the movable plate 200 is provided with a second elongated through hole 240 extending in the front-rear direction, the rotary plate 300 is rotatably connected to the connecting base 100 through a rotating shaft 330, and the rotating shaft 330 passes through the second elongated through hole 240. Therefore, the stability of the movement of the movable plate 200 in the front-rear direction is ensured.

In the description of the specification, the description with reference to the terms such as "some embodiments" means that specific features, structures, materials or characteristics described in connection with the embodiment or example are included in at least one embodiment or example of the present disclosure. In this description, exemplary descriptions of the foregoing terms do not necessarily refer to the same embodiment or example. Moreover, the specific features, structures, materials or characteristics described may be combined in any suitable manner in one or more embodiments.

Although the embodiments of the present disclosure have been shown and described, those having ordinary skills in the art should understand that various changes, modifications, replacements and variations may be made to the embodiments without departing from the principles and gist of the present disclosure, and the scope of the present disclosure is as defined by the appended claims and their equivalents.

What is claimed is:

1. A caster with horizontal braking, comprising:
a connecting base;
a wheel, rotatably connected to the connecting base; and
a brake assembly, comprising a movable plate and a rotary plate, wherein the movable plate is slidably connected to the connecting base to cause the movable plate to move in a front-rear direction, a brake pad is arranged at an end of the movable plate, the brake pad is located on a front side of the wheel, the movable plate is further provided with a first abutting plate, a limiting portion is arranged on the first abutting plate, the rotary plate is rotatably connected to the connecting base, a second abutting plate is arranged on the rotary plate, the first abutting plate is fitted with the second abutting plate, and the rotary plate is rotatable in a first direction or a second direction, wherein:
when the rotary plate is rotated in the first direction, the second abutting plate pushes the first abutting plate to move backward, the brake pad moves backward to abut against the wheel, and a rear end of the second abutting plate is abutted against the limiting portion; and
when the rotary plate is rotated in the second direction, the second abutting plate detaches from the limiting portion, and the wheel pushes the brake pad to move forward away from the wheel.

2. The caster with horizontal braking of claim 1, wherein the connecting base is provided with at least one first elongated through hole extending in the front-rear direction, and the movable plate is provided with at least one insertion strip which is inserted into the at least one first elongated through hole.

3. The caster with horizontal braking of claim 2, wherein the at least one first elongated through hole of the connecting base comprises two first elongated through holes, the at least one insertion strip comprises two insertion strips each provided on a respective one of an upper side and a lower side of the movable plate, and the two insertion strips are respectively inserted into the two first elongated through holes.

4. The caster with horizontal braking of claim 1, wherein the first abutting plate tilts backward from top to bottom, the second abutting plate tilts backward from top to bottom, and a rear side of the second abutting plate is fitted with a front side of the first abutting plate.

5. The caster with horizontal braking of claim 4, wherein the first abutting plate comprises a first portion, a second portion, and the limiting portion, and a lower end of the first portion is connected to an upper end of the second portion through the limiting portion.

6. The caster with horizontal braking of claim 5, wherein the first portion tilts backward from top to bottom, the second portion tilts backward from top to bottom, and the limiting portion tilts forward from top to bottom.

7. The caster with horizontal braking of claim 1, wherein an axis of a rotating shaft of the rotary plate and an axis of the wheel lie in a same straight line.

8. The caster with horizontal braking of claim 1, further comprising a first pedal, wherein the first pedal is fixedly connected to a front end of the rotary plate.

9. The caster with horizontal braking of claim 8, further comprising a second pedal, wherein the second pedal is fixedly connected to a rear end of the rotary plate.

10. The caster with horizontal braking of claim 1, wherein the movable plate is provided with an elongated through hole extending in the front-rear direction, the rotary plate is rotatably connected to the connecting base through a rotating shaft, and the rotating shaft passes through the elongated through hole.

* * * * *